(12) United States Patent
Gremaud et al.

(10) Patent No.: US 8,819,434 B2
(45) Date of Patent: *Aug. 26, 2014

(54) METHOD AND PROCESSING UNIT FOR SECURE PROCESSING OF ACCESS CONTROLLED AUDIO/VIDEO DATA

(75) Inventors: Fabien Gremaud, Chatel-St-Denis (CH); Olivier Brique, Jongny (CH)

(73) Assignee: Nagravision S.A., Cheseaux-sur-Lausanne (CH)

(*) Notice: Subject to any disclaimer, the term of this patent is extended or adjusted under 35 U.S.C. 154(b) by 195 days.

This patent is subject to a terminal disclaimer.

(21) Appl. No.: 12/971,876

(22) Filed: Dec. 17, 2010

(65) Prior Publication Data

US 2011/0154042 A1    Jun. 23, 2011

(30) Foreign Application Priority Data

Dec. 17, 2009    (EP) ..................................... 09179559

(51) Int. Cl.
*H04L 9/32* (2006.01)

(52) U.S. Cl.
USPC ......................................... 713/171; 380/200

(58) Field of Classification Search
None
See application file for complete search history.

(56) References Cited

U.S. PATENT DOCUMENTS

| | | | |
|---|---|---|---|
| 5,029,207 A * | 7/1991 | Gammie | 380/228 |
| 5,689,565 A * | 11/1997 | Spies et al. | 713/189 |
| 7,043,020 B2 * | 5/2006 | Maillard et al. | 380/227 |
| RE39,166 E | 7/2006 | Gammie | |
| 7,720,351 B2 * | 5/2010 | Levitan | 386/250 |
| 2002/0126844 A1 * | 9/2002 | Rix et al. | 380/211 |
| 2004/0098603 A1 * | 5/2004 | Corinne | 713/193 |
| 2005/0055551 A1 | 3/2005 | Becker | |
| 2006/0083371 A1 * | 4/2006 | Duval et al. | 380/28 |
| 2006/0109982 A1 * | 5/2006 | Puiatti et al. | 380/200 |
| 2006/0117392 A1 * | 6/2006 | Courtin et al. | 726/27 |
| 2006/0123246 A1 * | 6/2006 | Vantalon et al. | 713/189 |

(Continued)

FOREIGN PATENT DOCUMENTS

| | | |
|---|---|---|
| EP | 1 078 524 | 11/1999 |
| EP | 1 421 789 | 12/2002 |

(Continued)

OTHER PUBLICATIONS

International Search Report issued in International Application No. PCT/EP2009/056505, mailed Sep. 21, 2009.

(Continued)

*Primary Examiner* — Jeffrey Pwu
*Assistant Examiner* — Carlos Amorin
(74) *Attorney, Agent, or Firm* — DLA Piper LLP US

(57) ABSTRACT

A method based on access conditions verification performed by two conditional access devices consecutively on a control message before releasing a control word to a descrambler. The control message encapsulates a second part including another control message. The processing unit for carrying out the method comprises a first conditional access device connected to a second conditional access device provided with a descrambler and a secured processor or secured hardware logic. The control message and the second part are each encrypted and accompanied by respectively first and second authentication data. The first conditional access device decrypts and verifies integrity of the control message, verifies the first access conditions and transmits the second part to the second access control device. The second conditional access device decrypts and verifies integrity of the second part and further verifies the second access conditions, and releases and loads the control word into the descrambler.

14 Claims, 2 Drawing Sheets

(56) References Cited

U.S. PATENT DOCUMENTS

| | | | |
|---|---|---|---|
| 2007/0169173 A1* | 7/2007 | Brown et al. | 726/2 |
| 2007/0223695 A1 | 9/2007 | Beun et al. | |
| 2007/0250912 A1* | 10/2007 | Rassool et al. | 726/4 |
| 2007/0253551 A1 | 11/2007 | Guillot et al. | |
| 2007/0286422 A1* | 12/2007 | Cocchi et al. | 380/239 |
| 2008/0080711 A1* | 4/2008 | Gagnon et al. | 380/239 |
| 2009/0007240 A1* | 1/2009 | Vantalon et al. | 726/4 |
| 2009/0028328 A1* | 1/2009 | Munsell et al. | 380/239 |
| 2009/0254996 A1* | 10/2009 | Conus et al. | 726/27 |
| 2010/0024043 A1* | 1/2010 | Neau | 726/27 |
| 2010/0169664 A1* | 7/2010 | Danois et al. | 713/189 |
| 2010/0183149 A1* | 7/2010 | Candelore | 380/210 |
| 2010/0299528 A1* | 11/2010 | Le Floch | 713/179 |
| 2011/0058509 A1* | 3/2011 | Wei | 370/310 |
| 2011/0075843 A1* | 3/2011 | Gremaud et al. | 380/236 |
| 2011/0099364 A1* | 4/2011 | Robyr et al. | 713/150 |
| 2011/0238991 A1* | 9/2011 | Schipper | 713/168 |
| 2012/0008781 A1* | 1/2012 | Chevallier et al. | 380/255 |
| 2012/0060034 A1* | 3/2012 | Hutchings et al. | 713/171 |

FOREIGN PATENT DOCUMENTS

| | | |
|---|---|---|
| EP | 1 485 857 | 7/2003 |
| EP | 1 523 188 | 4/2005 |
| EP | 1 703 731 | 9/2006 |
| FR | 2 871 017 | 12/2005 |
| WO | WO 99/57901 | 11/1999 |
| WO | WO 00/13412 A1 * | 3/2000 |
| WO | WO 02/102704 | 12/2002 |
| WO | WO 03/050750 | 7/2003 |
| WO | WO 2006/040482 | 4/2006 |
| WO | WO 2009/068519 | 6/2009 |
| WO | WO 2009/144264 | 12/2009 |
| WO | WO 2009/144264 A1 * | 12/2009 |

OTHER PUBLICATIONS

Written Opinion issued in International Application No. PCT/EP2009/056505, mailed Sep. 21, 2009.
Yvo G. Desmedt, "Threshold Cryptography", 100 European Transactions on Telecommunications and Related Technologies, vol. 5, No. 4, Jul.-Aug. 1994, pp. 35-43.
European Search Report issued in EP 09 17 9559, mailed Mar. 30, 2010.
English language abstract of FR 2 871 017, published Dec. 2, 2005.
English language abstract of EP 1 703 731, published Sep. 20, 2006.
International Search Report issued in PCT/EP2010/069829, dated Jan. 31, 2011.
Written Opinion issued in PCT/EP2010/069829, dated Jan. 31, 2011.
U.S. Appl. No. 12/995,003.
U.S. Appl. No. 13/524,756.

* cited by examiner

METHOD AND PROCESSING UNIT FOR SECURE PROCESSING OF ACCESS CONTROLLED AUDIO/VIDEO DATA

CROSS-REFERENCE TO RELATED APPLICATIONS

This application claims the benefit under 35 U.S.C. §119(a) of European Patent Application No. 09179559.1, filed on Dec. 17, 2009.

BACKGROUND OF THE INVENTION

1. Field of the Invention

The present invention relates to units for secure processing of access controlled digital audio/video data. These units are included in different multimedia facilities as for example personal computers, mobile equipment or digital pay television decoders. A method for processing said audio/video data before output towards a peripheral device of a user is also described.

2. Technical Background

A digital audio/video data processing unit like a digital television decoder or "set top box" includes a main module gathering essential functions for the decryption of the received data, generally called deciphering or descrambling unit or calculation module. The audio/video data entering the calculation module is encrypted with control words CW transmitted in a control message ECM (Entitlement Control message) stream associated with the audio/video data stream. The calculation module includes a particular circuit in charge of extracting the control words CW from the control messages ECM and decrypting them using keys made available by the processing unit and/or by a security module associated to said unit.

A security module can be implemented in a variety of manners such as on a microprocessor card, on a smartcard or any electronic module in the form of a badge or key. These modules are generally portable and detachable from the host user unit and are designed to be tamper-proof. The most commonly used form has electrical contacts, but contactless versions of type ISO 14443 also exist. Another implementation of the security module consists either of a directly soldered integrated circuit inside the user unit or a circuit on a socket or connector such as a SIM (Subscriber identity Module) module. The security module may also be integrated on a chip which has another function e.g. on a descrambling module or on a microprocessor module of a pay television set top box. The security module can also be implemented as software.

A control message ECM contains, in addition to the control word, access conditions required for the control word to be sent back to the processing unit. At the time of the decryption of a control message usually encrypted by a transmission key, the security module verifies if the conditions to access audio/video data sent in a stream are satisfied, i.e. the access rights stored in the security module are present. These rights are generally sent by entitlement management messages EMM which update the rights stored in the security module.

The control word is only returned to the processing unit when the rights verification is successful. According to a known Pay-TV broadcasting mode, three elements are necessary to decrypt a program at a given time, namely:

a) Data related to the program encrypted by one or a plurality of control words, b) Control message(s) ECM containing the control words and access conditions, c) Corresponding user rights stored in the security module allowing verifying the access conditions.

Accounting for the use of audio video content or other conditional access data is based on subscription, purchases of selected programs or on payment by time units.

In order to improve security of the control words which are the most sensitive elements of a Pay-TV system, several solutions have been developed such as for example:

The document EP1485857B1 describes a method for matching a decoder with a removable security module. The system formed by the decoder and the security module receives digital audio/video data encrypted by a control word and control messages ECM containing the encrypted control word. A first key is assigned to the decoder and a second key to the security module. These two keys form a unique pair in the broadcast network of the audio/video data. Only one key of the key pair can be chosen arbitrarily while the other is determined according to the first key in a way that the combination of these two keys conforms to a pairing key of the system, thus allowing to decrypt the control word.

The document EP1421789B1 discloses a process of controlling access to encrypted data transmitted by an operator to a plurality of subscribers groups. Each group has a group key and each subscriber receives from the operator an operating key encrypted by the group key to decipher the transmitted data. The process consists of associating the operating key encrypted with the group key to a random value for generating a secret code. This code is transmitted via a management message EMM to the subscribers to calculate the operating key at the reception of the random value transmitted by control messages ECM. The process uses only one access control and it allows for dissuading the publication of the operating keys by making them dependent on the subscriber group.

The document EP1078524B1 describes a coupling or matching method in order to make a security module dependent on the host apparatus, in this case a Pay-TV decoder, and vice versa. The aim of this matching mechanism is to protect the communications between the security module and the decoder in order to prevent the capture, from the transmission channel, of the control words allowing for the deciphering of the transmitted program data. The matching allows also for the prevention of the use of the security module with a foreign host apparatus or conversely. The solution uses a unique key or a unique key pair to encrypt and decrypt the data exchanged between the security module and the decoder. This unique key is maintained secret and unchanged during the whole life of the related devices. One or other of the connected devices can verify, at any moment, the validity of the matching parameters and take appropriate counter-measures when a match is not found.

The document WO2006/040482 describes a method of recomposing a control word on the one hand by a security module and on the other hand by a decoder. Neither of the two devices alone can obtain the complete control word. The message including the two parts of the control word moreover contains two access conditions, one for the security module and the other for the decoder.

The document WO2009/144264A1 describes a method for secure processing digital access controlled audio/video data and a processing unit configured for the same and able to receive control messages. The control messages comprise at least one first control word and first right execution parameters, at least one second control word and second right execution parameters. The processing unit being connected to a first access control device comprises:

means for verifying and applying the first right execution parameters in relation to the contents of a memory associated to the first access control device and means for obtaining the first control word, a second access control device integrated into the processing unit including means for verifying and applying the second right execution parameters in relation to the contents of a memory associated to the second access control device and means for obtaining the second control word, a deciphering module configured for deciphering, sequentially with the first and the second control word, the access controlled audio/video data, the first and second control words being provided respectively by the first and second access control devices and stored in said deciphering module.

The document EP1523188A1 discloses a method for pairing a first element and a second element, wherein the first element and the second element form a first decoding system among a plurality of receiving decoding systems in a broadcasting network. Each receiving decoding system is adapted to descramble scrambled audiovisual information received over the broadcasting network. A first key unique in the broadcasting network is selected. A second key is determined according to the first key, such that a combination of the first key and the second key enables to decrypt broadcasted encrypted control data that is received to be decrypted by each receiving decoding system, the encrypted control data being identical for each receiving decoding system. The first key and the second key are assigned respectively to the first element and the second element.

The document U.S. Pat. No. 5,029,207A discloses a decoder for descrambling encoded satellite transmissions comprising an internal security element and a replaceable security module. The program signal is scrambled with a key and then the key itself is twice-encrypted and multiplexed with the scrambled program signal. The key is first encrypted with a first secret serial number which is assigned to a given replaceable security module. The key is then encrypted with a second secret serial number which is assigned to a given decoder. The decoder performs a first key decryption using the second secret serial number stored within the decoder. The partially decrypted key is then further decrypted by the replaceable security module using the first secret serial number stored in the replaceable security module. The decoder then descrambles the program using the twice-decrypted key.

To sum up, the security of the control words may be improved by the following measures:

a transmission through a secured channel between the security module and the processing unit, a plurality of conditional access modules requiring each a verification of the access conditions or rights, reception of a control word in several parts sent either in one or several control messages. Appropriate instructions allow rebuilding the control word from its parts by a processing module before making it available to the descrambler.

SUMMARY OF THE INVENTION

The present invention aims to reinforce the security of the control words while increasing the efficiency and the speed of the verification operations. A combination of the first two above mentioned measures contributes to achieve this aim according to the method described by claim 1.

The method consists mainly of access conditions verification performed by two conditional access devices consecutively on a control message before releasing a control word and forwarding it to a descrambler. The control message is structured so that it encapsulates another control message.

In a preferred embodiment the connection between the first and the second conditional access device is secured thanks to a pairing mechanism using pairing keys unique to the first conditional access device and to the second conditional access device.

A further object of the invention is a processing unit for secure processing of access controlled audio/video data comprising features as described by claim 8.

A conventional control message comprises access conditions and a control word. According to the method of the present invention; the control message is structured as the conventional control message with a first part including access conditions and, in place of the control word, a second part structured as a control message including second access condition and a control word. Thus, the control message encapsulates another control message.

In document WO2009/144264A1, the final control word is obtained by a cryptographic combination of a first part obtained by a first access control device such as a removable security module and a second part obtained by a second access control device such as a chip integrated in the processing unit. The control messages transport rights execution parameters data necessary to the access control devices for producing the appropriate control word used for deciphering scrambled audio/video data. The two access control devices thus function together, i.e. in parallel.

In the present invention, the control message needs to be verified and processed by the first conditional access device before transmitting the second part structured as another control message to the second conditional access device. After verification, this second conditional access device extracts the control word from the second part. In this case the two conditional access devices function sequentially one after the other i.e. in series.

BRIEF DESCRIPTION OF THE FIGURES

The invention will be better understood thanks to the following detailed description which refers to the enclosed drawings given as non limitative examples.

DETAILED DESCRIPTION OF THE INVENTION

Figure 1:
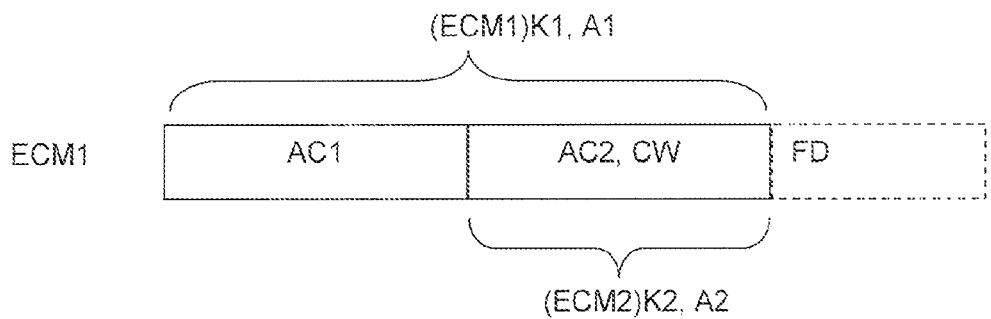
FIG. 1 shows the structure of a control message involved in a preferred embodiment of the method of the invention

The control message ECM1=(AC1, ECM2) is made up of a first part including first access conditions AC1 and of a second part ECM2 structured as a control message ECM2=(AC2, CW) including at least second access conditions AC2 and a control word CW, see FIG. 1. In other words, the control message ECM1 includes a secret represented by the second part ECM2 which includes the control word CW as a secret. The control message ECM1 encapsulates thus another control message ECM2.

Further data FD such as headers, data stream identifiers, parameters related to the broadcast data or to the broadcaster, etc., generally complete the control message ECM1.

The first access conditions AC1 which appear in general in form of rights necessary to the user for accessing one or more broadcast audio/video data streams. These rights consist of codes, which indicate a subscription, an authorization for accessing an event or broadcast program content or a validity period of the access, etc. Preferably, the control message ECM1 is encrypted with a key K1 specific to a first conditional access device CAD1 in the form of a security module for example as defined above in the technical background section.

The second part ECM2 of the control message ECM1 includes second access conditions AC2 which preferably complete the first access conditions AC1 with further parameters related for example to characteristics of a processing unit PU associated to the first conditional access device CAD1. This second part ECM2 is preferably also encrypted with a key K2 specific to a second conditional access device CAD2 implemented inside the processing unit PU in the form of a component of a system on chip SOC according to a preferred configuration. The second part ECM2 further includes the control word CW which can be retrieved only if the first and the second access conditions AC1 and AC2 are in accordance with the access conditions stored in the conditional access devices CAD1 and CAD2.

According to a preferred configuration, the first conditional access device CAD1 is provided with more advanced features needing a more detailed verification of the access conditions AC1 than the second conditional access device CAD2.

The control message ECM1 and the second part ECM2 are preferably accompanied by authentication data A1 and A2, i.e. authentication data A1 is associated to the control message ECM1 and authentication data A2 is associated to the second part ECM2. These authentication data A1 and A2 are provided by the broadcaster or the head end equipped with appropriate units for preparing the different streams of access controlled audio/video data DATe. The authentication data A1 and A2 are used for verifying the authenticity and integrity of the messages after decryption with the keys K1 and K2 specific to respectively the first and second conditional access device CAD1 and CAD2.

The authentication data A1 and A2 may be in the form of a message authentication code (MAC) which is compared with a code calculated by the conditional access device (CAD1, CAD2) and when the code of the concerned control message ECM1, or part ECM2 is identical to the calculated code, the control message ECM1, and part ECM2 are considered as authentic. HMAC (Hash-based Message Authentication Code), may also be used by involving a cryptographic hash function in combination with a secret key known by the respective conditional access devices (CAD1, CAD2). Any iterative cryptographic hash function, such as MD5 or SHA-1, may be used in the calculation of an HMAC; the resulting MAC algorithm is called HMAC-MD5 or HMAC-SHA1 accordingly. Other techniques of authentication may also be used such as RSA (Rivest, Shamir, Adleman) algorithms with symmetric or asymmetric keys.

Figure 2:
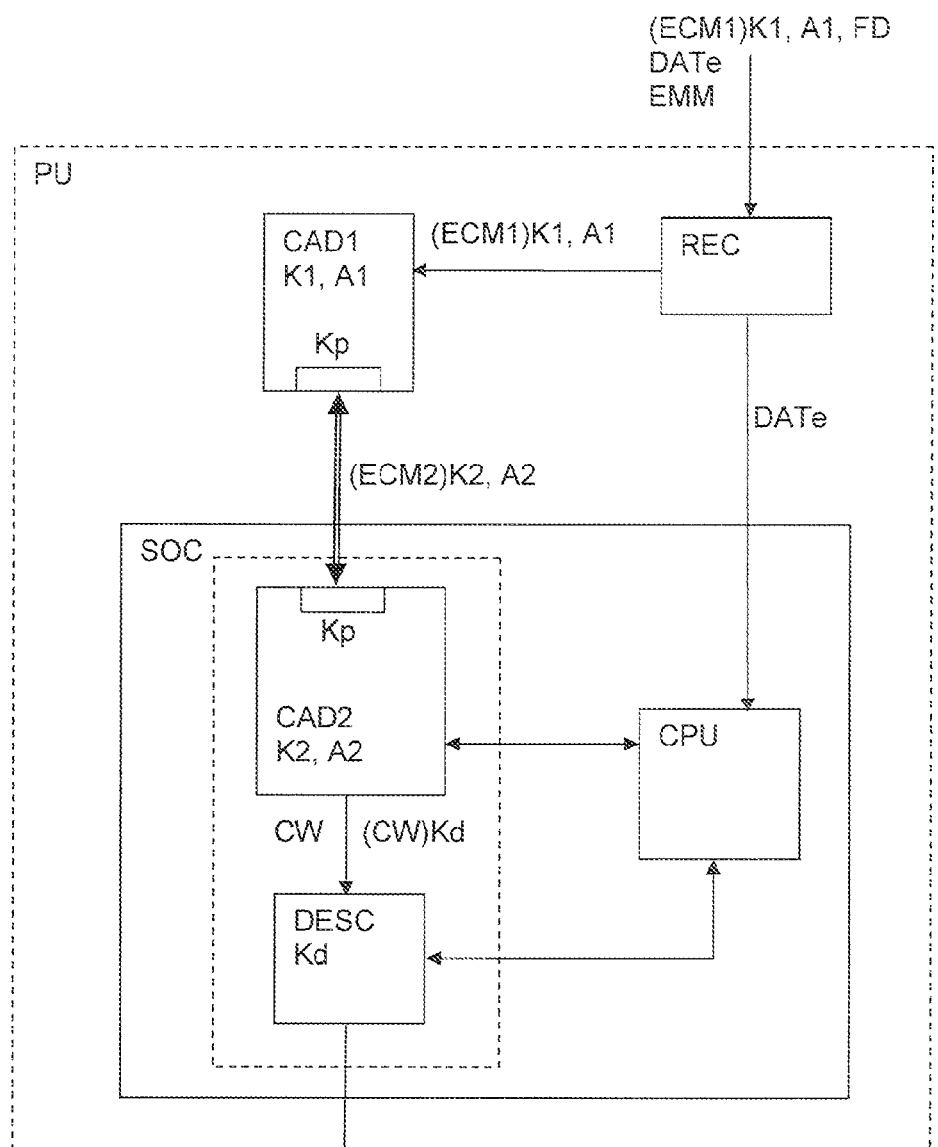
FIG. 2 shows a block diagram of a processing unit provided with two conditional access devices respectively in the form of a security module and in the form of a system on chip.

The processing unit PU as represented schematically by FIG. 2 comprises a receiving module REC into which enter a stream of encrypted audio/video content data DATe and a stream of control data comprising a stream of control messages ECM1 sent by the broadcaster together with management messages EMM for updating the access conditions AC1 and AC2 stored in the processing unit PU.

After sorting the input data, the receiving module REC forwards the control messages ECM1 to the first conditional access device CAD1 while the encrypted audio/video data DATe is buffered in the processing unit PU by waiting for their descrambling with the control word CW to be retrieved. The conditional access device CAD1 receives the control message ECM1 for decrypting with the key K1 stored in an appropriate memory and for verifying the authenticity thanks to the authentication data A1. The second part ECM2 of the control message is temporally stored in the first conditional access device CAD1 until complete verification of the first access conditions AC1 has been performed.

When the control message ECM1 has passed the authenticity and integrity tests, the first access conditions AC1 are compared with access conditions stored in the memory of the first conditional access device CAD 1. If this verification of concordance is successful, the previously stored second part ECM2 of the control message is transmitted to the second conditional access device CAD2 for decrypting with the device key K2 which is generally distinct from the one of the first conditional access device CAD1. Authenticity and integrity of the second part ECM2 is also checked thanks to the authentication data A2 in a similar way than for the control message ECM1 in the first conditional access device CAD1.

After passing this check, the verification of the second access conditions AC2 by comparison with access conditions stored in the second conditional access device CAD2 is performed in a manner similar to that in the first conditional access device CAD1. Only if the verification has been successful the control word CW is released and loaded into the descrambler DESC. The access controlled audio/video data DATe provided by the receiving module REC are forwarded to a processor CPU and to the descrambler DESC which uses the control word CW for deciphering said access controlled audio/video data in order to obtain clear audio/video data (DATc) at an appropriate output of the processing unit (PU).

According to an embodiment, in particular where the descrambler is detached from the second conditional access device CAD2, the control word CW is encrypted by a specific key Kd embedded in the descrambler DESC. Only if a successful verification of the second access conditions AC2 has been carried out can the control word CW be decrypted and loaded into the descrambler DESC.

According to the method of the invention, besides the knowledge of the conditional access devices key K1 and K2, two consecutive access conditions AC1, AC2 must be fulfilled consecutively for obtaining the control word CW necessary for descrambling the input audio/video data DATe.

In most of the implementations, the control messages are encrypted by the broadcaster with a transmission key KT known by the first conditional access device CAD1. The method therefore includes a preliminary step of decrypting the control message ECM1 at reception by the first conditional access device CAD1 before executing the further processing steps.

It has to be noted that in case of unsuccessful verifications carried out either on integrity or on the access condition conformity, the processing unit PU will block any access to the input audio/video data stream. Such events may be signaled to the user by means of appropriate error messages so that necessary updates and repairs can be made for restoring the blocked access.

According to an embodiment, the connection between the first and the second conditional access device CAD1, CAD2 is secured by means of a pairing mechanism as described for example in the document EP1078524B1. The second part ECM2 of the control message ECM1 is transmitted to the second conditional access device CAD2 further encrypted by a unique pairing key Kp known by the first and second conditional access device CAD1, CAD2.

The second conditional access device CAD2 verifies the pairing with the first conditional access device CAD1 preferably at each reception of a second part ECM2 transmitted by the first conditional access device CAD1. Only if the pairing verification is successful the second conditional access device CAD2 decrypts the second part ECM2 with the key K2 and verifies its authenticity with the authentication data A2 and the second access conditions AC2 are checked in relation to the contents of the memory of the second access control device CAD2.

The secured connection with the pairing feature between the first and the second conditional access device is preferably implemented in case of a processing unit where the first conditional access device CAD1 arises in the form of a removable security module such as a smart card. On the contrary when the first conditional access device CAD1 consists of a fixed security module set up inside the processing unit on a mother board carrying the complete processing circuitry, such a secured channel may be not necessary.

An embodiment of the processing unit according to the invention comprises a second conditional access device CAD2 integrated on a single chip as a system on chip SOC comprising a separate secured processor CPU or secured hardware logic controlling a hardware/software module and the descrambler DESC. The hardware/software module is configured for decrypting the second part ECM2 of the control message ECM1, for verifying the second access conditions AC2 and the integrity of said second part ECM2, and for releasing and loading the control word CW into the descrambler DESC. In such a single chip configuration, an access to the control word CW during loading into the descrambler becomes quite impossible without destroying the chip. The secured processor CPU may be replaced by hardware logic dedicated to execute the different tasks of the control messages processing allowing for the obtention of the control word CW according to the described methods.

Figure 3:
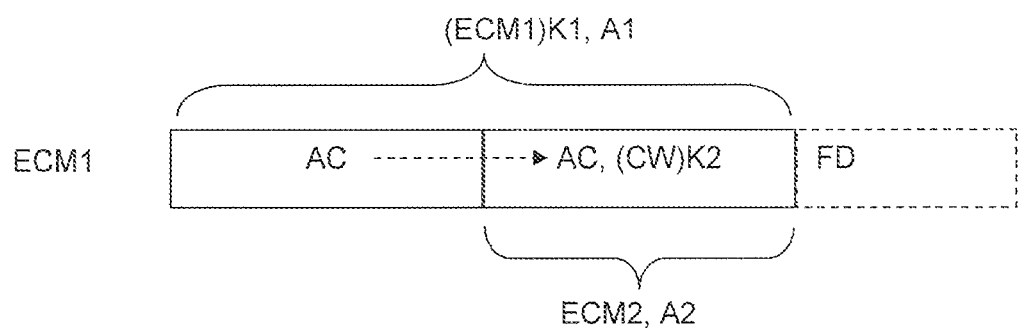
FIG. 3 shows the structure of a control message involved in an optional embodiment of the method of the invention.

According to an optional embodiment, the access conditions AC1 and AC2 respectively of the first part of the control message ECM1 and of the second part ECM2 are equivalent, i.e. AC=AC1=AC2 as illustrated by FIG. 3. The verification of the access conditions AC may be carried with both the first access control device CAD1 and the second access control device CAD2. Optionally, only the first access control device CAD1 verifies the access conditions AC and authorizes the second access control device CAD2 to release and load the control word CW into the descrambler (DESC).

In a further embodiment the access conditions AC2 may be a function of the first access condition AC1, i.e. AC2=F(AC1) instead of being equivalent or identical to the first access conditions AC1. In this case, the first access device CAD computes the access conditions AC1 by applying a function F to said access conditions AC1 and then transfers the resulting access conditions F(AC1) to the second conditional access device CAD2. In an implementation, the function F simplifies the access conditions AC1 in order to reduce time and calculations of verification carried out by the second access device CAD2. The function F may be a mathematical function as well as a data truncation or a data sorting function.

The advantage of these two embodiments is that the size of the control message ECM1 is reduced as well as the bandwidth necessary for the stream to transmit the control messages ECM1 to the processing units or secured hardware logic.

It has to be noted that the access conditions AC are not necessarily contained in the second part ECM2 but they may be added by the first conditional access device CAD1 to the second part ECM2 before its transfer to the second conditional access device CAD2. The access conditions AC are then also authenticated with the second part ECM2, i.e. the access conditions AC are also included in the authentication data A2.

According to a further embodiment, the control message ECM1 encrypted by a key K1 of the first conditional access device CAD1 and accompanied by the first authentication data A1 contains the access conditions AC and the second part ECM2. This second part ECM2 contains at least the control word CW which may be encrypted by the key K2 of the second conditional access device CAD2 and is accompanied by the second authentication data A2.

According to a preferred embodiment the second authentication data A2 is a function of at least the access conditions AC received by the second conditional access device CAD2 and of the second part ECM2 including at least the control word CW, i.e. A2=F(AC, CW) or A2=F(AC, K2(CW)) if the control word CW is encrypted by the key K2.

Further data such as metadata MD specific for the second conditional access device CAD2 may be added into the second part ECM2 besides the control word CW or the encrypted control word K2(CW). This metadata MD may comprise headers, identifiers, parameters related to the broadcast content etc. in this case, the authentication data A2 is also function of the metadata i.e. A2=F(AC, CW. MD).

In the processing method, the access conditions AC once verified by the first conditional access device CAD1 are provided to the second conditional access device CAD2 along with the control word CW encrypted with the key K2 and the authentication data A2. Verification of the access conditions AC is also performed by the second conditional access device CAD2 before decryption of the control word CW with the key K2. According to an embodiment the access conditions AC may be partially transferred to the second access condition device CAD2 in particular in the embodiment where AC2=F(AC1) instead of AC=AC1=AC2. The transferred part is then the most important part of the access conditions AC to be checked by the second conditional access device CAD2 while the whole access conditions AC have already been verified by the first conditional access device CAD1.

As in the first embodiment, the control messages ECM1 may be encrypted by the broadcaster with a transmission key KT known by the first conditional access device CAD 1. The optional method therefore also includes a preliminary step of decrypting the control message ECM1 at reception by the first conditional access device CAD1 before executing the further processing steps.

In this option, securing the connection between the first and the second conditional access device CAD1, CAD2 by means of a pairing mechanism is recommended since the access conditions AC are transferred in clear after decryption of the control message ECM1. The pairing key Kg then encrypts all data transferred to the second conditional access device CAD2, i.e. the second part ECM2 containing the control word CW encrypted by the key K2, the second authentication data A2 and the access conditions AC.

Nevertheless, access conditions alone do not consist of critical or sensitive data so that the pairing may be not mandatory, but the authentication data A2 and its verification is necessary to be made by the second conditional access device CAD2.

The invention claimed is:

1. A method for secure processing of access controlled audio/video data by a processing unit comprising a first conditional access device connected to a second conditional access device provided with a descrambler and a secured processor or secure hardware logic, said processing unit receiving encrypted control messages, the method comprises steps of:

receiving a control message by the first conditional access device, said control message being structured in an ECM (entitlement control message) format, the control message comprising a first part including first access conditions and, in place of a control word of the ECM format, a second part structured as a control message including second access conditions and a control word, wherein the first access conditions comprise rights for accessing broadcast audio/video data streams, and wherein the second access conditions complete the first access conditions with parameters related to the processing unit;

decrypting the control message with a key specific to the first conditional access device and verifying authenticity of said control message with first authentication data associated to the control message;

verifying the first access conditions of the control message in relation to contents of a memory of the first conditional access device and when the verification is successful, transmitting the second part to the second conditional access device;

receiving the second part by the second conditional access device;

decrypting the second part with a key specific to the second conditional access device and verifying authenticity of said second part with second authentication data associated to the second part;

verifying the second access conditions of the second part in relation to contents of a memory of the second conditional access device and when the verification is successful, releasing and loading the control word into the descrambler; and descrambling the access controlled audio/video data by using the control word and providing said audio/video data in clear to an appropriate output of the processing unit.

2. The method according to claim 1 including a preliminary step of decrypting the control messages, said control messages being encrypted by a transmission key known by the first conditional access device.

3. The method according to claim 2 wherein the control word is encrypted by a specific key embedded in the descrambler, said control word being decrypted and loaded into the descrambler only if a successful verification of the second access conditions has been carried out.

4. The method according to claim 2 wherein the second part is transmitted to the second conditional access device further encrypted by a unique pairing key known by the first and second conditional access device, said second conditional access device verifies pairing with the first conditional access device at each reception of a second part transmitted by the first conditional access device, and on condition that pairing verification is successful, the second access conditions are verified in relation to contents of the memory of the second conditional access device.

5. The method according to claim 4 wherein the control word is encrypted by a specific key embedded in the descrambler, said control word being decrypted and loaded into the descrambler only if a successful verification of the second access conditions has been carried out.

6. The method according to claim 1 wherein the first access conditions are equivalent to the second access conditions.

7. The method according to claim 6 wherein the second authentication data is a function of at least the second access conditions received by the second conditional access device and of the second part.

8. The method according to claim 1 wherein the first conditional access device computes the second access conditions by applying a function to the first access conditions and then transmits the second part and the resulting second access conditions to the second conditional access device.

9. The method according to claim 7 wherein the second authentication data is a function of at least the second access conditions received by the second conditional access device and of the second part.

10. A processing unit for secure processing of access controlled audio/video data comprising:

a first conditional access device; and a second conditional access device connected to the first conditional access device and provided with a descrambler and a secured processor or secured hardware logic;

wherein the first conditional access device is configured for:

receiving and decrypting an encrypted control message with a key specific to the first conditional access device, said control message being structured in an ECM (entitlement control message) format, the control message comprising a first part including first access conditions and, in place of a control word of the ECM format, a second part structured as a control message including second access conditions and a control word, wherein the first access conditions comprise rights for accessing broadcast audio/video data streams, and wherein the second access conditions complete the first access conditions with parameters related to the processing unit;

verifying authenticity of said control message with first authentication data associated to the control message; and verifying the first access conditions of the control message in relation to contents of a memory of the first conditional access device and when the verification is successful, the second part is transmitted to the second conditional access device;

wherein the second conditional access device is configured for:

receiving and decrypting the second part with a key specific to the second conditional access device;

verifying authenticity of said second part with second authentication data associated to the second part; and verifying the second access conditions of the second part in relation to contents of a memory of the second conditional access device and when the verification is successful, the control word is released and loaded into the descrambler; and wherein the descrambler is configured for descrambling the audio/video data with the control word and for forwarding said data to an output of the processing unit.

11. The processing unit according to claim 10 wherein the first conditional access device consists of a removable security module inserted in the processing unit.

12. The processing unit according to claim 10 wherein the first conditional access device consists of a fixed security module set up inside the processing unit.

13. The processing unit according to claim 10 wherein the second conditional access device consists of a system on chip comprising a separate secured processor or dedicated hardware logic controlling a hardware/software module and the descrambler, the hardware/software module being configured for decrypting the second part of the control message, for verifying, the second access conditions and integrity of said second part, and for releasing and loading the control word into the descrambler.

14. The processing unit according to claim 10 wherein the first conditional access device and the second conditional access device are connected together through a secured channel in which the second part is transmitted encrypted by a unique pairing key stored in the first and the second conditional access device.

* * * * *